Figure 1:
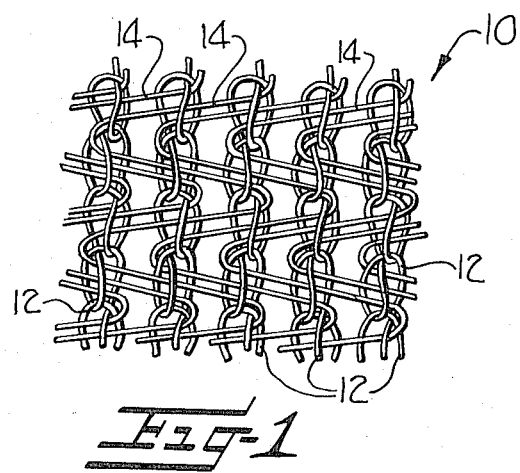

United States Patent [19]
Nisbet et al.

[11] 3,787,272
[45] Jan. 22, 1974

[54] GLASS FABRIC SUITABLE FOR CASTS, BANDAGES, AND THE LIKE

[75] Inventors: John L. Nisbet; Hubert C. Woodall, Jr., both of Winston-Salem, N.C.

[73] Assignee: Carolina Narrow Fabric Company, Winston-Salem, N.C.

[22] Filed: Aug. 23, 1972

[21] Appl. No.: 282,927

Related U.S. Application Data

[62] Division of Ser. No. 888,447, Dec. 29, 1969, Pat. No. 3,686,725.

[52] U.S. Cl.................... 161/89, 128/90, 128/156, 66/195
[51] Int. Cl................................................. A61l 15/00
[58] Field of Search .......... 128/156, 90; 8/138, 154; 66/195; 161/89, 93

[56] References Cited
UNITED STATES PATENTS
3,413,080  11/1968  Schlagenhof et al. ................ 8/154
2,433,279  12/1947  Johnson ............................... 66/195

FOREIGN PATENTS OR APPLICATIONS
600,765  6/1960  Canada................................. 8/138
688,230  3/1953  Great Britain........................ 8/154

OTHER PUBLICATIONS

"Glass Plastic Cast" by Anderson et al., The American Journal of Surgery, pp. 299–305, 1945.

Primary Examiner—Richard A. Gaudet
Assistant Examiner—J. Yasko
Attorney, Agent, or Firm—Paul B. Bell et al.

[57] ABSTRACT

A relatively open air permeable glass fiber fabric for use in orthopedic casts, bandages and the like and comprising interlaced chemically desized glass yarns consisting essentially of filaments having an average diameter not greater than about 0.00021 inches.

9 Claims, 2 Drawing Figures

PATENTED JAN 22 1974  3,787,272

GLASS FABRIC SUITABLE FOR CASTS, BANDAGES, AND THE LIKE

This application is a division of application Ser. No. 888,447 filed Dec. 29, 1969, and now U.S. Pat. No. 3,686,725.

The present invention relates to a glass fiber fabric for use in orthopedic casts, bandages and the like, and more particularly, to a glass fabric characterized by air permeability, conformability, substantial strength, non-wettability to water, and compatibility with skin contact.

It has long been recognized that a textile fabric fabricated from inorganic glass fibers possesses physical properties, such as high strength, moisture non-absorbtiveness, and dimensional stability, which make it ideally suited for many end uses where these properties are important. Orthopedic casts, bandages and other skin contact applications are end uses where such properties are very important, but conventional glass fabrics have heretofore not been usable for these products and applications, since the glass fibers used therein also possess several undesirable characteristics. For example, the individual fibers or filaments tend to be rather non-resilient or brittle, and therefore easily fractured and, once broken and free, the loose filaments generate irritation when brought in contact with the skin. Also, the non-resilient nature of the fibers prevent use wherever the fabric must be highly flexible and readily conformable to the shape of an irregular object, such as the contours of the body of a wearer.

The non-resilient or brittle nature of glass fiber materials results in part from the very nature of conventional glass filaments and in part from the processing of the filaments during the manufacturing process forming the filaments into a fabric. Glass filaments for use in conventional glass fabrics are extruded in diameters of usually above 0.00021 inches and these filaments are relatively stiff, non-resilient and brittle, and when broken are highly abrasive and irritating to the skin.

Also, as is well known, glass filaments are initially coated with a size material as soon as possible after extrusion to lubricate and protect the filaments during the subsequent manufacturing processes. Usually, this size is a starch size similar to those conventional starch sizes used in other textile operations, but other sizes might be advantageously employed. For example, in certain applications the size may consist essentially of polyvinyl alcohol. Prior to the application of any finish to the glass fiber yarn or fabric, the size must be removed since it would otherwise inhibit the proper application of the desired finish to the fabric. Presently, the size is removed by heat cleaning the material at a temperature of approximately 750° F., or above, which in effect burns or vaporizes the size while leaving a small carbon and/or ash residue. While this heat cleaning is effective to clean the glass and permit application of the desired finish, it also tends to degrade the strength, flexibility and abrasion resistance of the yarns, and thus the strength and versatility of the fabric. Also, the heat cleaning process renders the glass somewhat plastic at the elevated temperature, and the configuration of the yarns when heated is set or fixed, e.g., the woven crimp or knitted stitches are set in the fabric. This tends to stiffen the fabric and to reduce its flexibility and conformability.

Accordingly, it is an object of the present invention to provide a glass fabric which possesses air permeability, improved strength, flexibility, conformability and compatibility with skin contact and is therefore adapted for use in orthopedic casts, bandages and the like.

This and other objects and advantages of the present invention are achieved in the embodiment described herein through the provision of a glass textile fabric characterized by air permeability, conformability, moisture resistance, substantial strength and compatibility with skin contact, having sufficient flexibility to conform to the contours of the body of a wearer and comprising interlaced chemically desized glass yarns consisting essentially of highly flexible filaments substantially non-irritating to the skin and having an average diameter not greater than about 0.00021 inches.

Figure 2:
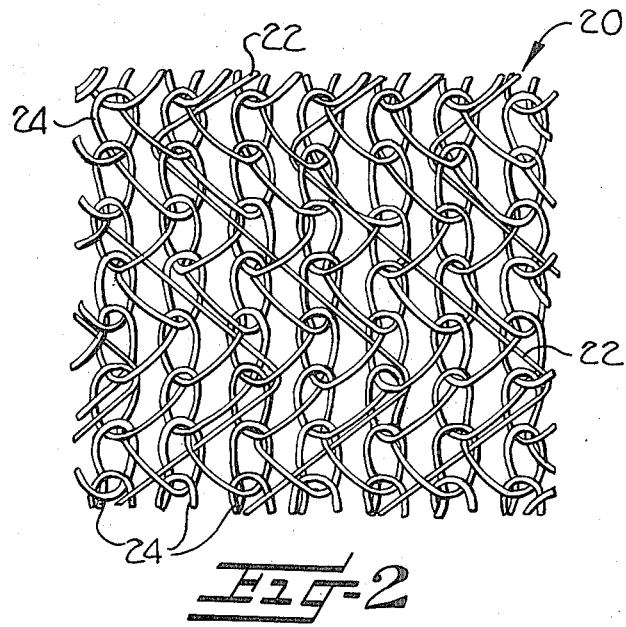

The drawings schematically illustrate two examples of specific knitted fabric constructions which may be utilized in the present invention. Briefly described, FIG. 1 shows a warp knitted construction 10 wherein the chain stitched yarns 12 are interconnected by three laid-in yarns 14 to produce a resilient, relatively open textile; and FIG. 2 shows a similar warp knitted construction 20 wherein a single laid-in yarn 22 extends between three of the interconnected chain stitches 24.

In accordance with the present invention, it has been found that a fiber glass material of extremely high quality and strength, and with a high degree of flexibility and abrasion resistance, can be produced without the necessity of using a heat cleaning process of desizing. Rather, the material may be desized by subjecting it to the action of a size converting enzyme or other chemical which renders the size soluble and permits it to be washed away. Unlike heat cleaning, chemical cleaning does not degrade the strength of the fiber glass and it also produces a cleaner material in that no carbon or ash residue is produced.

It has also been found that a glass fiber material consisting essentially of very fine, individual filaments having a diameter not greater than about 0.00021 inches possesses greatly increased flexibility and strength, and also is less irritating in skin contact. In particular, it has been found that as the diameter of an individual glass filament decreases, it becomes more flexible, less easily broken, and thus stronger per unit of weight. The reason for this increased flexibility and strength is believed to arise from the fact that a small diameter filament may be bent around a sharp corner with less bending stress on its molecules than can a larger diameter filament. The extreme flexibility of these very fine individual filaments gives rise to an additional advantage in that such filaments will bend before penetrating human or animal tissue. Thus, loose filaments which may be present in the fabric are non-irritating to skin contact.

As examples of extremely fine glass filaments possessing the above properties, it is noted that yarns consisting of glass filaments having an average diameter of approximately 0.00015 inches are commercially available and are known as B (or beta) filament yarns. At the present time, B filaments are believed to be the smallest or finest glass fibers capable of commercial production. Filaments having an average diameter of approximately 0.00018 inches are known as C filaments, while filaments having a diameter of approximately 0.00021 inches are known as D filaments.

From the above, it will be apparent that where the flexibility, strength, and non-irritating nature of the finished fabric are of paramount importance, it is desirable to employ the finest filament yarns obtainable. In this regard, it has been found that B and C filament yarns are preferable where contact with human skin is contemplated, while D filaments are generally satisfactory where contact with the skin of most animals is contemplated. Yarns having a filament diameter greater than about 0.00021 inches have been found to be irritating to both human and animal skin. Continuous filament yarns are preferred to staple filament yarns since there will be fewer loose filaments to form abrasive surfaces.

It is a further aspect of the present invention to fabricate the above described glass fiber material into a fabric which is resilient, strong and yet air permeable. The desirability of these properties in a bandaging material, or in an orthopedic cast, such as described in a patent to Beightol, U.S. Pat. No. 3,421,501, issued on Jan. 14, 1969, will be apparent since the fabric must closely conform to the anatomy of the body portion in question and also permit passage of ventilating air to the surface of the skin. Obviously, a wide variety of knitted or woven constructions could be employed with the present invention to provide the desired physical properties in the finished fabric. Specifically, it is important to choose a fabric construction having sufficient interstices or openings through the interlaced yarns of the fabric to permit the free passage of air, which has a desirable softness of hand, and which is somewhat resilient, and readily flexible and conformable. For examples of knitted constructions which possess these characteristics, reference is made to FIGS. 1 and 2 showing conventional warp knitted fabrics having laid-in yarns. In the case of a bandaging material, the fabric is typically in the form of a long narrow strip having non-raveling or non-slit selvages extending along its longitudinal side edges.

Production of a fiber glass fabric as described above may be accomplished by chemically desizing either the producer sized yarns, or the fabric consisting of producer sized yarns, while the material is in wound package form. A conventional yarn package dye machine may be employed which is capable of forcing a treatment solution (or in this case a desizing solution) through the material packages. After desizing, each individual yarn (or fabric) end can then be treated or coated, as for example by padding a coupling agent or a dye containing resin finish or both, onto a running length of the material, drying or curing the coating, and rewinding the material onto another package all in a continuous operation. Alternatively, the yarn (or fabric) could be treated while remaining in package form by forcing a solution containing the coating through the packages. In the case of yarn, the thus coated yarn can then be knit into a fabric in the conventional manner, with the coupling agent or finish serving to lubricate and protect the yarn filaments during the knitting operation.

The following is a specific non-limiting example of a process embodying the present invention; unless otherwise noted, all percentages of chemicals referred to are based upon the weight of the particular bath.

EXAMPLE 1

72 3-pound convolute wound packages, comprising a long bandage-like 3-inch wide warp knitted fabric tape having selvages extending along its longitudinal side edges and consisting essentially of 150/1/0/s starch sized continuous filament fiber glass yarns, were wound on hollow perforated dye tubes. The packages were then loaded into a conventional yarn package dyeing machine having a 150 gallon capacity.

Wetting Out and Scouring

To penetrate and wet-out the starch coating, the yarn packages were then scoured for 10 minutes at 180° F. in an aqueous bath containing 0.10% "Triton X-102," a high cloud point non-ionic surfactant marketed by Rhom and Haas and identified as an alkyl aryl polyether alcohol prepared by the reaction of t-octylphenol with ethylene oxide and having an average polyoxyethylene chain length of 12 to 13. The bath is then dropped. (The above surfactant will also serve to wash away any polyvinyl alcohol size which may be present with the starch).

Desizing Bath

The loaded dyeing machine was again filled with 150 gallons of water at 180° F. to which was added a desizing formulation as follows:

| Ingredient | Amount |
|---|---|
| (a) Stabilizing Agent for the Enzyme (Common Salt NACl) | 0.54% |
| (b) Surfactant (Triton X-102) (Rhom and Haas) (Identified previously) | 0.10% |
| (c) pH Adjusting Agent (Sodium Acetate) | 0.02% |
| (d) a Desizing Enzyme (Rhozyme GC Extra) (a diastatic enzyme marketed in liquid form by Rhom and Haas and filtered prior to using. Significant properties of the product are: 6000 FM units minimum activity; 1870 BAU units minimum activity; 9.5 lb/gal. density at 25°C.; 1.14 specific gravity at 25°C.; pH 6.0 (as packed); 5 cps. Brookfield Viscosity at 25°C. (as packed) (No. 1 spindle, 60 r.p.m); freezing point-slush + 14°F., solid − 4°F.; and being water-dilutable in all proportions) | 0.27% |

This bath was forced through the packages for a period of 30 minutes with 5 minute cycle shifting whereupon desizing was completed. The bath was then dropped.

FM units (sometimes referred to as Rhofon or liquefying units) may be defined as follows: An emzyme with 1,000 FM units will reduce the viscosity of 300 times its weight of potato starch or 560 times its weight of tapioca starch by 90 percent in 10 minutes at 70° and pH 6.7. BAU units are measured by Standard Text Method AATCC 103-1965, Assay of Bacterial Alpha-Amylase Enzymes Used In Desizing.

Washing

For washing the desized yarn, the machine was again filled with water at 180° F. containing 0.10% "Triton X-102" (above identified) whereupon the packages were then scoured for 20 minutes. This bath was then dropped and the packages were subjected to a plain hot water (180° F.) wash for 10 minutes and then a hot running water (180° F.) wash to clear the bath.

Finishing

For initially treating or coating the fabric, an aqueous solution containing about 1/4 to 1/2% silane coupling agent ("A-187" as produced by Union Carbide, and identified as gamma-glycidoxypropyltrimethoxysilane was forced through the packages in the package dye machine immediately after the washing operation. The packages were them removed from the package dye machine and dried by forcing heated air through the packages in the conventional manner until the packages were dry. After drying, the fabric was rewound onto a suitable tube for shipment or further treatment.

Where further treatment is desired, the fabric could be coated with a suitable finishing resin, such as for example those specifically set forth in the above Beightol patent. Any conventional process, such as a continuous padding operation, could be employed. In this case, the silane coupling agent not only serves to facilitate bonding of the finishing resin to the glass yarns, but it also serves to in some degree lubricate and protect the fibers during the finishing operations.

It will occur to those skilled in the art, that many equivalent chemicals might be substituted in the heretofore specified formulations without significantly altering the results obtainable.

For example, other desizing enzymes, both of the diastatic type for solubilizing starch sizes, as well as proteases for protein sizes, are readily available and may be chosen for use based upon the particular size involved as well as other conditions of temperature, pH, etc. If polyvinyl alcohol size is employed, it may be solubilized and washed away in an aqueous bath which may include a surfactant such as the above identified "Triton X-102."

Likewise, there is a wealth of other surfactants available in the art and the criteria for choosing the proper one are well known in the textile finishing art.

The use of stabilizing and pH adjusting agents in the desizing bath will be also dictated by conditions and circumstances and many alternative chemicals are available, if needed, as will be apparent to those skilled in the art. In this regard, it may be noted that the "Rhozyme GC Extra" enzyme is most efficient between pH 6 and 7.

The initial treatment of the fiber glass material with a coupling agent as described above makes possible an extremely strong bonding bridge between the normally weakly adherent glass surface and a subsequently applied resinous finishing material. Of course, both the coupling agent and resin finish could be applied concurrently with the coupling agent being an ingredient in the resin solution. There are a great number of commercially available coupling agents in addition to the one specified above, and the particular one utilized should be selected on the basis of its compatibility with the particular finishing resin to be employed. For example, "Volan" as produced by DuPont may be utilized. "Volan" is a Werner type compound in which methacrylic acid is coordinated with chromium to form a highly reactive complex. Additionally, Dow Corning's "Z-6040," glycidory-propyltrimethoxy silane, is satisfactory for present purposes.

In practicing the present invention, it is important to minimize the handling of the fiber glass yarn or fabric, particularly during and after desizing and until the finish is applied, since during this period, the fibers are exposed to themselves and abrasion damage is likely unless extreme caution is exercised. It will be understood that desizing and initially treating the yarn or fabric in package form does so minimize handling and is therefore the preferred method of carrying out these processes. However, the initial treatment could be accomplished by padding the coupling agent onto a running length of the material where care is exercised through the use of proper tensioning devices to prevent damage to the yarn or fabric. Where the initial treatment consists only of a coupling agent as is the case in the above example, less care is required in the application of the finishing resin since the coupling agent serves in some degree to lubricate and protect the fibers during this process.

In the drawings and specification, there has been set forth a preferred embodiment of the invention, and although specific terms are employed, they are used in a generic and descriptive sense only and not for purposes of limitation.

That which is claimed is:

1. An improved glass textile material characterized by air permeability, conformability, moisture resistance, substantial strength and compatibility with skin contact and being thereby adapted for use in orthopedic casts, bandages and the like, said glass textile material comprising a relatively open, air permeable fabric having sufficient flexibility to conform to the contours of the body of a wearer and having sufficient interstices to permit the free passage of air therethrough and consisting essentially of interlaced chemically desized glass yarns consisting of highly flexible filaments substantially non-irritating to skin brought into contact therewith and having an average diameter not greater than 0.00021 inches.

2. The glass textile material as defined in claim 1 wherein said textile material further comprises a coupling agent adhered to the surface of said yarns.

3. The glass textile material as defined in claim 1, wherein said filaments are continuous.

4. The glass textile material as defined in claim 1 wherein said textile material comprises a relatively narrow, elongated strip having selvages extending along its longitudinal side edges.

5. The glass textile material as defined in claim 1 wherein said filaments have an average diameter between 0.00015 inches and 0.00018 inches.

6. An improved glass textile material characterized by air permeability, conformability, moisture resistance, substantial strength and compatibility with skin contact and being thereby adapted for use in orthopedic casts, bandages and the like, said glass textile material comprising a relatively open, air permeable fabric having sufficient flexibility and resilience to conform to the contours of the body of a wearer and having sufficient interstices to permit the free passage of air therethrough and consisting essentially of interknit chemically desized glass yarns consisting of highly flexible filaments substantially non-irritating to skin brought into contact therewith and having an average diameter not greater than 0.00021 inches.

7. The glass textile material as defined in claim 6 wherein said filaments are continuous and including a coupling agent adhered to the surface of said yarns.

8. The glass textile material as defined in claim 7 wherein said textile material comprises a relatively narrow elongated strip having selvages extending along its longitudinal side edges.

9. The glass textile material as defined in claim 7 wherein said filaments have an average diameter between 0.00015 inches and 0.00018 inches.

* * * * *